(12) United States Patent
Warner et al.

(10) Patent No.: US 6,220,779 B1
(45) Date of Patent: Apr. 24, 2001

(54) JOINT FOR CONNECTING EXTRUDABLE SEGMENTS

(75) Inventors: Mark J. Warner; Michael D Blair, both of North Ogden, UT (US)

(73) Assignee: Cordant Technologies Inc.

( * ) Notice: Subject to any disclaimer, the term of this patent is extended or adjusted under 35 U.S.C. 154(b) by 0 days.

(21) Appl. No.: 09/263,212

(22) Filed: Mar. 5, 1999

Related U.S. Application Data

(63) Continuation of application No. PCT/US97/15116, filed on Sep. 3, 1997.
(60) Provisional application No. 60/025,362, filed on Sep. 3, 1996.

(51) Int. Cl.⁷ .................................................... B65D 8/04
(52) U.S. Cl. ........................... 403/381; 403/293; 220/684
(58) Field of Search .................................... 403/381, 293, 403/292; 220/682, 683, 684, 685

(56) References Cited

U.S. PATENT DOCUMENTS

| 295,295 | 3/1884 | Sinclair . |
|---|---|---|
| 1,175,168 | 3/1916 | Moulton . |
| 1,489,274 | 4/1924 | Petty . |
| 2,347,309 | 4/1944 | Zoldok . |
| 2,354,485 | 7/1944 | Slaughter . |
| 2,388,297 | 11/1945 | Slaughter . |
| 2,861,277 | 11/1958 | Hermann . |
| 2,895,753 | 7/1959 | Fentiman . |
| 3,039,649 | 6/1962 | Aleck . |
| 3,291,437 | 12/1966 | Bowden et al. . |
| 3,302,814 | 2/1967 | Dohner . |
| 3,588,027 | 6/1971 | Bowden . |
| 3,690,500 | 9/1972 | Remane . |
| 3,727,363 | 4/1973 | Kinsey . |
| 3,951,294 | 4/1976 | Wilson . |
| 4,222,576 | 9/1980 | Clements . |
| 4,324,081 | 4/1982 | Chicha . |
| 4,550,539 | 11/1985 | Foster . |
| 4,946,056 | 8/1990 | Stannard . |
| 5,078,530 | 1/1992 | Kim . |

FOREIGN PATENT DOCUMENTS

| 1666839 | 7/1991 | (AW) . |
|---|---|---|
| 701058 | 12/1940 | (DE) . |
| 1129982 | 9/1956 | (FR) . |
| 1290641 | 3/1962 | (FR) . |
| 2032506 | 5/1980 | (GB) . |
| 2040430 | 8/1980 | (GB) . |

OTHER PUBLICATIONS

The Shapemakers, A publication of the Aluminum Extruders Council.
PCT Search Report dated Dec. 4, 1997.
PCT Search Report dated Nov. 13, 1998.

*Primary Examiner*—Anthony Knight
*Assistant Examiner*—Alison K. Pickard

(57) ABSTRACT

A joint is disclosed for connecting extruded segments to form a container, such as a pressure vessel for storing liquid propane. In cross section, joint includes a pair of symmetrical tabs, each tab configured at the end of adjacent arcuate outer wall segments. Tabs are configured for contiguous engagement to form a boss having a proximate neck portion and a distal body portion. Joint also includes a retaining member configured at the end of an internal web segment. Retaining member is configured to capture boss. A sealing weld is utilized to seal the adjacent tabs at exposed seam.

29 Claims, 5 Drawing Sheets

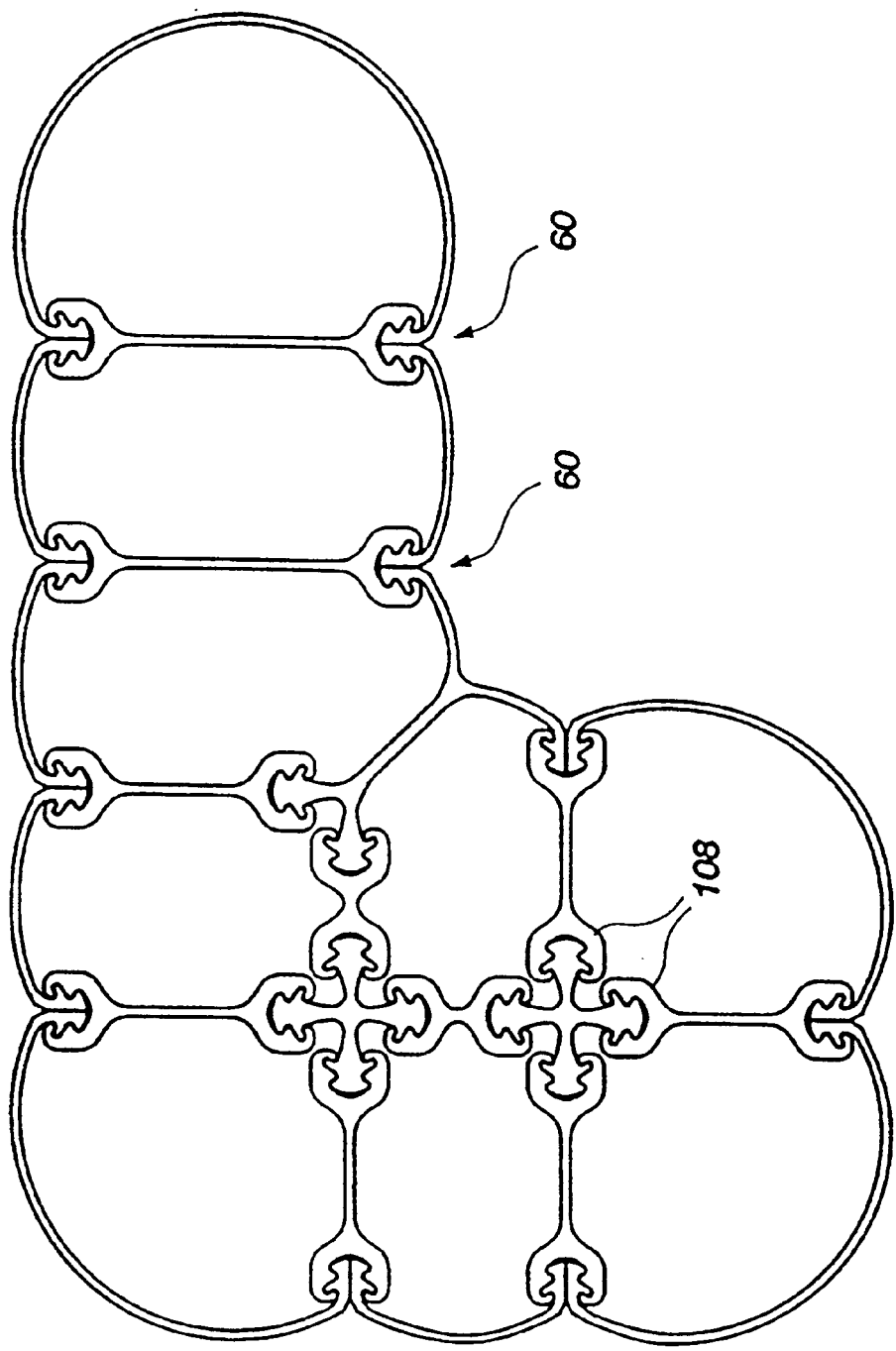

JOINT FOR CONNECTING EXTRUDABLE SEGMENTS

This is a Continuation of International Appln. No. PCT/US97/15116 filed Sep. 3, 1997 which designated in the U.S. This application claims the benifit of U.S. Provisional Application No. 60/025,362, filed Sep. 3, 1996.

BACKGROUND

1. The Field of the Invention

The present invention is related to an improved joint for connecting two or more segments of a structure. More particularly, the present invention is related to a joint for use in connecting extruded segments to form the body portion of a pressure vessel, such as a tank for storing liquid propane.

2. Technical Background

Pressure vessels are widely used to store liquids and gases under pressure. The storage capacity of a pressure vessel depends on the internal volume of the pressure vessel and the pressure the vessel is capable of safely containing. In addition to its storage capacity, the size, internal shape, external shape, and weight of the pressure vessel are often important.

One growing application of pressure vessels is their use in the storage of alternative fuels, such as propane, for use in vehicles such as automobiles. Propane is increasingly viewed as preferable to gasoline for fueling vehicles. Accordingly, approaches have been devised for converting gasoline-fueled vehicles to propane-fueled vehicles by retrofitting them to use propane instead of gasoline. Additionally, vehicles are now being built which are designed to operate using propane as fuel.

Typical propane storage tanks are cylindrical in shape. Positioning cylindrical storage tanks in the envelope utilized for a fuel tank in most vehicles results in substantial limitations in the amount of propane a vehicle can carry. Hence, storage tanks have been devised which utilize a plurality of arcuate outer wall segments which are connected by internal web segments to form a multi-cell pressure vessel. Such multi-cell pressure vessels have a generally uniform cross section, thereby enabling the outer wall segments to be formed by extrusion.

One disadvantage associated with such multi-cell pressure vessels is the difficulty of obtaining a secure and inexpensive joint for connecting adjacent segments. Typically, adjacent segments are connected by welding them together. One disadvantage to the use of such a welded joint is the high manufacturing cost resulting from welding multiple joints to form a single multi-cell pressure vessel.

Another disadvantage to the use of a welded joint is that welding the joint generally results in heat treating the edges of the wall segments, thereby reducing the strength of the wall segments adjacent the weld. When tested for burst strength, such welded pressure vessels frequently fail in the wall segments that were exposed to the heat from the welding process.

From the foregoing, it will be appreciated that it would be an advancement in the art to provide an improved joint for use in a multi-cell pressure vessel that would be inexpensive to manufacture and assemble.

It would be a further advancement in the art to provide an improved joint for use in a multi-cell pressure vessel which does not suffer from the reduced strength implications arising from heating the pressure vessel during welding.

Such a joint for use in a multi-cell pressure vessel is disclosed and claimed herein.

BRIEF SUMMARY AND OBJECTS OF THE INVENTION

The present invention is directed to a novel joint for use in constructing a body portion of a multi-cell vessel, such as a pressure vessel which may be used for the storage of compressed natural gas or liquid propane. Through the use of the present invention, segments may be extruded out of aluminum or other extrudable material and combined to form vessels having a variety of shapes and useful for a number of functions. Being extruded, the body portion of the vessel has a substantially uniform cross section.

A typical vessel having joints made according to the present invention comprises a number of arcuate outer wall segments connected with at least one internal web segment. Thus, in one embodiment, the joint of the present invention attaches adjacent ends of two arcuate outer wall segments and the end of one internal web segment.

The joint of the present invention is best defined by reference to its cross-sectional geometry. Thus, in cross section, one embodiment of the joint includes a tab configured at the end of each arcuate outer wall segment. The tabs of adjacent ends are symmetrical to each other and are configured for contiguous engagement, thereby forming an exposed seam. A sealing weld extends along the seam to attach adjacent tabs at the seam.

Each tab has a straight, back portion which is in contiguous engagement with the corresponding back portion of the adjacent tab. Together, the tabs form a boss having a proximate neck portion and a distal body portion. The neck portion of the boss has a width smaller than the width of the body portion of the boss, with the boss having a perimeter which is configured in a curvilinear shape.

The joint also includes a retaining member which is configured at the end of the internal web. The retaining member has two lobes which are symmetrical to each other and which extend about the body portion of the boss and terminate at the neck portion of the boss. The retaining member is configured to capture the boss formed at the adjacent ends of the two arcuate outer wall segments with the lobes of the retaining member positioned substantially contiguous to the entire exterior contour of the boss.

In an alternative embodiment of the present invention, a joint is provided for connecting at least a first and a second segment of a structure having a substantially uniform cross section. The segments are preferably formed of an extruded material, such as aluminum. The joint has the capability of bearing a tensile load applied to the segments along a load axis. In cross section, the joint includes a retaining member configured at the end of the first segment. The retaining member has a perimeter configured in a curvilinear shape and is configured with a first and a second pair of inwardly projecting lobes, each having a load bearing surface positioned at an angle with respect to the normal to the load axis. The angle of the load bearing surfaces of the first pair of lobes with respect to the normal to the load axis is opposite to the angle of the load bearing surfaces of the second pair of lobes with respect to the normal to the load axis. The retaining member is preferably configured to be symmetrical about the load axis.

The joint also includes a boss configured at the end of the second segment. Like the retaining member, the boss is preferably symmetrical about the load axis. The boss includes a proximate neck portion and a distal body portion, with the neck portion of the boss having a width smaller than the width of the body portion of the boss. The body portion of the boss is configured with a first and a second pair of outwardly projecting lips each having a load bearing surface.

Thus, the retaining member is configured to capture the boss. In its captured position, the load bearing surfaces of the first pair of lips are in engagement with the respective load bearing surfaces of the first pair of lobes of the retaining member and the load bearing surfaces of the second pair of lips are in engagement with the respective load bearing surfaces of the second pair of lobes of the retaining member. The first pair of lobes of the retaining member are positioned at a distal end of the first segment and are configured to mate with the boss at the neck of the boss. Additionally, the load bearing surfaces of the first pair of lobes extend inwardly towards the first segment, thereby providing a load bearing surface which counteracts the load applied at the load bearing surface of the second pair of lobes.

The retaining member includes two arms which extend about the body portion of the boss and terminate at the neck portion of the boss. The arms of the retaining member are symmetrical to each other about the load axis and are positioned in the joint to be substantially contiguous to the entire exterior contour of the boss.

The retaining member and boss are preferably configured such that the angle of the load bearing surfaces of the first pair of lobes with respect to the normal to the load axis is equal and opposite to the angle of the load bearing surfaces of the second pair of lobes with respect to the normal to the load axis. This angle of orientation generally ranges from about 30 to about 45 degrees with an orientation angle of about 30 degrees being presently preferred.

The joint of this embodiment is preferably utilized to connect together three segments. For such an application, the boss comprises two symmetrically shaped tabs positioned in contiguous engagement—one tab configured at the end of the second segment and the other tab configured at the end of a third segment. The tabs each have a straight, back portion which is in contiguous engagement with the corresponding back portion of the adjacent tab. The contiguous tabs form an exposed seam. A sealing weld is utilized for attaching the contiguous tabs at the exposed seam.

Thus, it is an object of the present invention to provide an improved joint for use in a multi-cell pressure vessel that is inexpensive to manufacture and assemble.

It is a further object of the present invention to provide an improved joint for use in a multi-cell pressure vessel which does not suffer from the reduced strength implications arising from heating the pressure vessel during welding.

These and other objects and advantages of the present invention will become more fully apparent by examination of the following description of the preferred embodiments and the accompanying drawings.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which:

FIG. 5 is a cross-sectional view of the body portion of a pressure vessel utilizing the joint illustrated in FIG. 4.

DETAILED DESCRIPTION OF THE PREFERRED EMBODIMENTS

Figure 1:
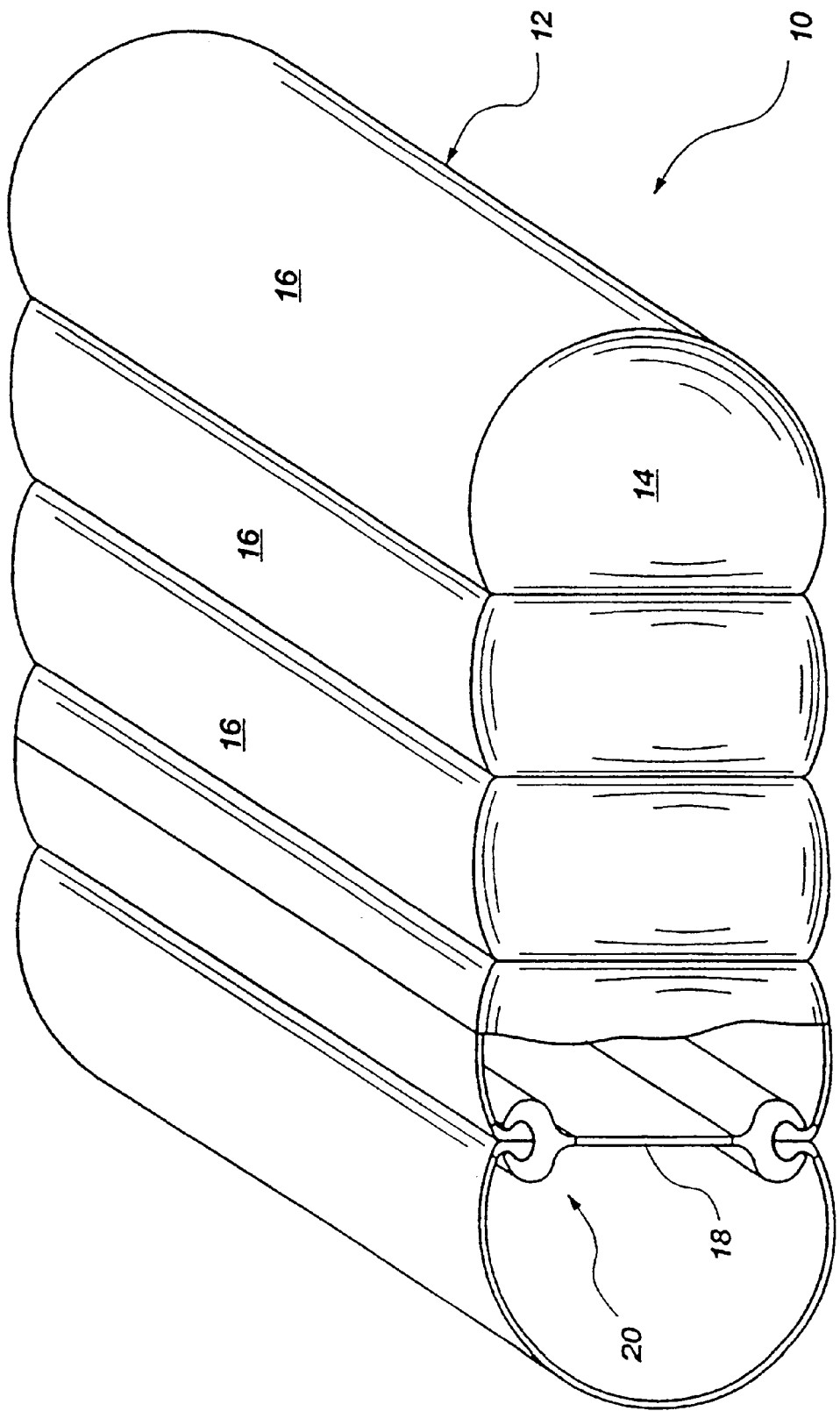
FIG. 1 is a perspective view of a pressure vessel with portions cut away to illustrate one embodiment of the joint of the present invention.

Reference is now made to the figures wherein like parts are referred to by like numerals throughout. With particular reference to FIG. 1, one embodiment of a multi-cell pressure vessel utilizing the joint of the present invention is generally designated at 10. The pressure vessel 10 includes a body portion 12 and end caps 14. The body portion 12 has a substantially uniform cross section.

The end caps 14 may be configured according to any of those designs which are conventionally known to one of skill in the art. Typically, the end caps 14 are configured to allow adjacent cells to be placed in fluid communication with each other via the end caps. Alternatively, orifices may be placed in the internal web segments for this purpose, as is known to those of skill in the art.

The body portion 12 of the pressure vessel is comprised of a plurality of arcuate outer wall segments 16. The outer wall segments 16 are connected with internal web segments 18, thereby defining the various cells of the pressure vessel 10. Because the body portion of the pressure vessel is configured with a substantially uniform cross section, the segments 16, 18 which comprise the body portion may be formed by extrusion.

Adjacent outer wall segments 16 are attached to a corresponding internal web segment 18 in accordance with the teachings of the present invention by utilizing a joint 20. Joint 20 extends the entire length of the body portion 12 and has a substantially uniform cross section throughout that length.

Because of its uniform cross section, joint 20 is best described with reference to its cross section, as illustrated in greater detail in FIG. 2. Thus, referring now to FIG. 2, joint 20 includes a tab 22 configured at the end of each arcuate outer wall segment 16. The tabs 22 of adjacent end segments are preferably configured to be symmetrical to each other. Additionally, adjacent tabs 22 are configured for contiguous engagement with each other, thereby forming an exposed seam 24 along the exterior surface of the pressure vessel.

A sealing weld 25 extends along the seam 24. In contrast to the welds which are utilized on conventional multi-cell pressure vessels wherein the weld must bear the entire load imposed upon the joint, the weld 25 utilized along seam 24 is utilized primarily to seal the joint. Although it may contribute to the load-bearing properties of the joint, it's strength may be substantially reduced in comparison to the load-carrying welds utilized in prior art joints. It is presetly preferred to utilize an electron beam welder to make weld 25. One of skill in the art will appreciate that other sealing methods may also be employed along seam 24.

Each tab 22 is preferably configured with a straight, back portion 26 which is in contiguous engagement with the corresponding back portion 26 of the adjacent tab. With the tabs 22 positioned in contiguous engagement along their respective back portions 26, the tabs 22 unitedly form a boss 28. The boss 28 is thus configured with a aproximate neck portion 30 and a distal body portion 32. As illustrated in FIG. 2, the neck portion 30 of the boss 28 has a width smaller than the width of the body portion 32 of the boss 28. The boss 28 preferably has a perimeter which is configured in a curvilinear shape.

The joint 20 also includes a retaining member 40 which is configured at the end of the internal web segment 18. The retaining member 40 includes two lobes 42 which are preferably symmetrical to each other. The lobes 42 extend about the body portion 32 of the boss 28 and terminate at the neck portion 30 of the boss 28. The retaining member 40 is thus configured to capture the boss 28 with the lobes 42 of the retaining member 40 positioned substantially contiguous to the entire exterior contour of the boss 28.

One of the principal advantages of the present invention is the ability to form by extrusion long wall segments which are connected using the joint of the present invention to form the body portion of pressure vessels. These wall segments (and joint components) are preferably formed of aluminum, such as 6061-T6 or 6063 aluminum. One of skill in the art will appreciate that a variety of materials could be utilized in the extrusion of these segments, depending on the particular application for which they are to be used.

Figure 2:
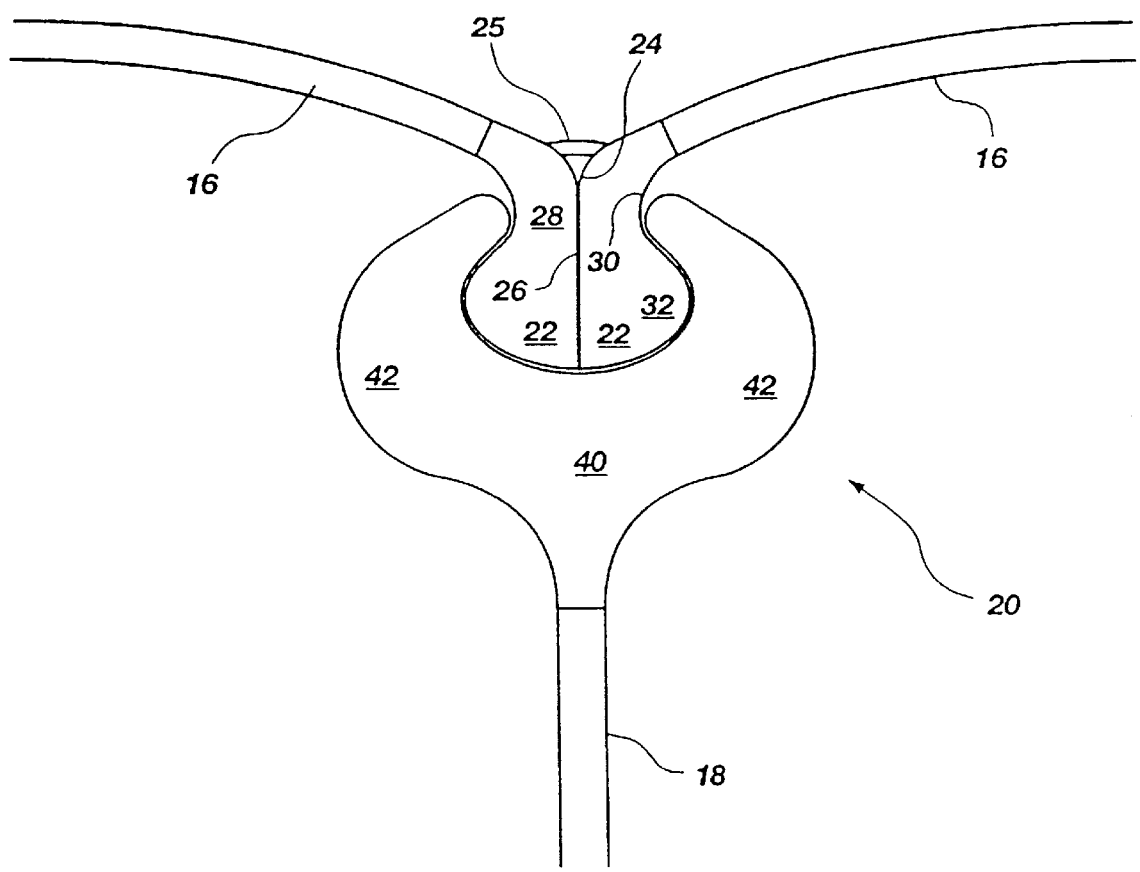
FIG. 2 is an enlarged cross-sectional view of the joint illustrated in FIG. 1.

Utilizing the embodiment of the joint illustrated in FIGS. 1–2, a variety of shapes of pressure vessels may be formed through extrusion. For example, in FIG. 3, one such non-conventionally shaped pressure vessel 50 utilizing the joint of the present invention is illustrated. Pressure vessel 50 thus includes a variety of shapes of exterior segments 52, various sizes of internal web segments 54, and one hybrid segment 56 which includes both exterior segments and an internal web segment. Indeed, with a limited number of different sizes of modular segments, pressure vessels having a variety of shapes and sizes could be constructed.

Figure 4:
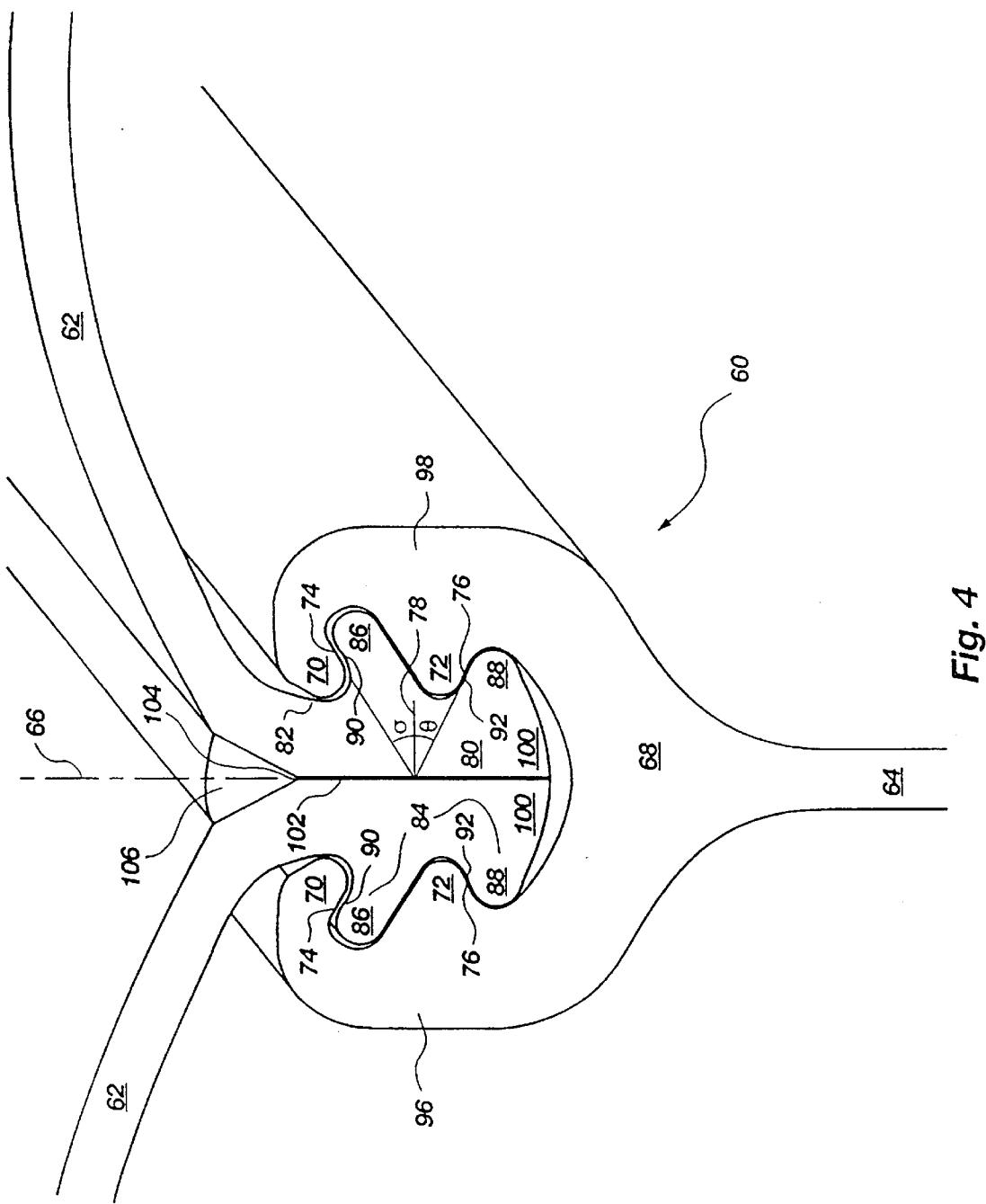
FIG. 4 is a cross-sectional view of an alternative embodiment of the joint of the present invention.

Referring now to FIG. 4, an alternative embodiment of the joint of the present invention is illustrated and described. In FIG. 4, a double-acting joint 60 connecting two outer wall segments 62 and an inner web segment 64 is disclosed. It should be appreciated, however, that double-acting joint 60 may be utilized to connect any of a variety of segments together. Thus, although illustrated as connecting two outer wall segments and an internal web segment, joint 60 may also be used to connect a single outer wall segment to an internal web segment, to connect two outer wall segments to each other, or to connect two internal web segments to each other, as dictated by the configuration of the pressure vessel to be constructed.

Figure 3:
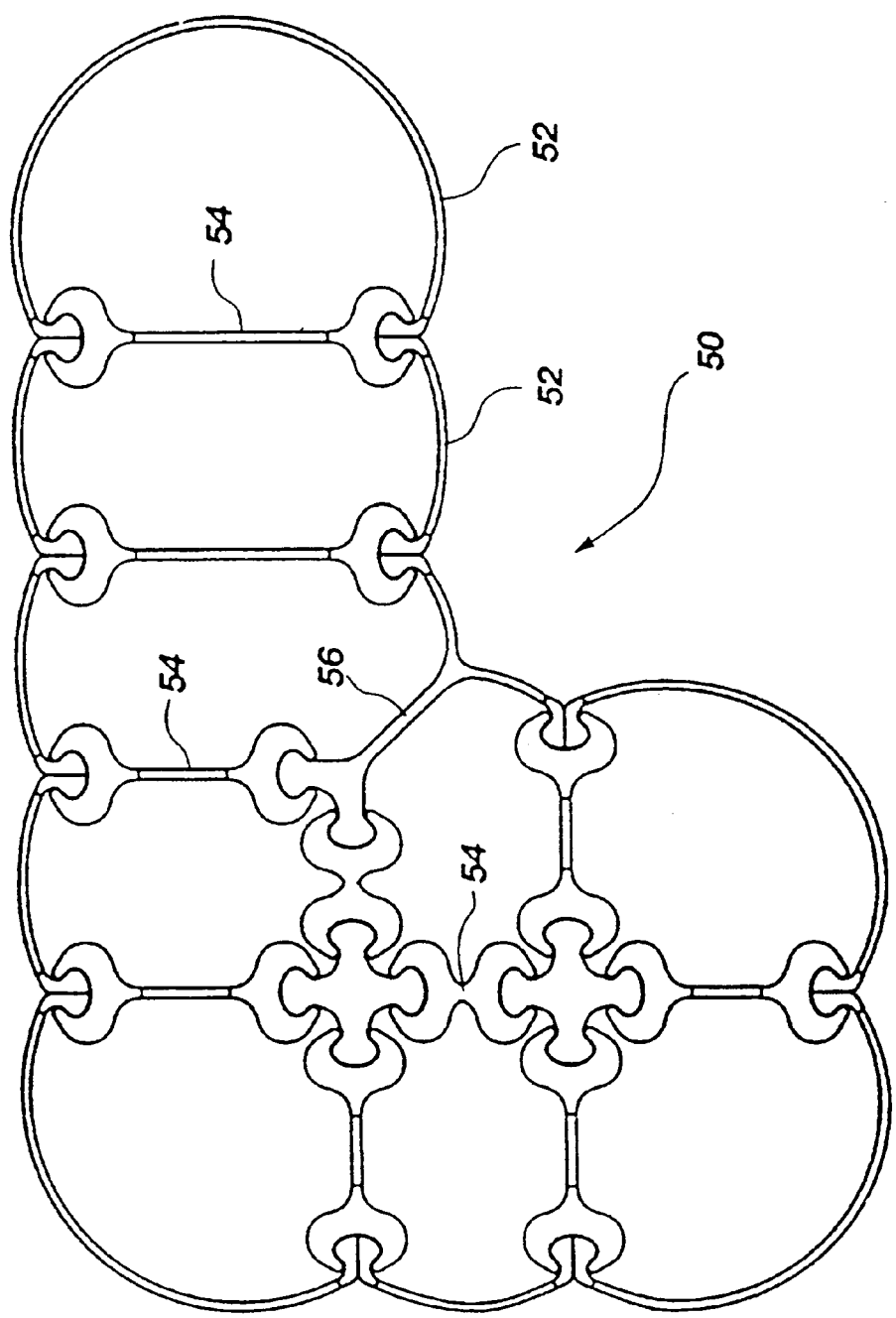
FIG. 3 is a cross-sectional view of the body portion of a pressure vessel utilizing the joint illustrated in FIGS. 1 and 2.

As with joint 20 illustrated in FIGS. 1 through 3, double-acting joint 60 has the capability of bearing a tensile load applied to the segments along a load axis 66. The joint 60 includes a retaining member 68 configured at the end of the inner web segment 64. The retaining member 68 has a perimeter configured in a curvilinear shape and is configured with a first pair 70 and a second pair 72 of inwardly projecting lobes. Each lobe is configured with a load bearing surface positioned at an angle relative to the load axis 66. Thus, each lobe of the first pair of lobes 70 includes a load bearing surface 74 and each lobe of the second pair of lobes 72 includes a load bearing surface 76.

The retaining member 68 is preferably configured to be symmetrical about the load axis 66. Also, the retaining member 68 is preferably configured such that the angle σ of the load bearing surfaces 74 of the first pair of lobes 70 with respect to the normal 78 to the load axis 66 is equal and opposite to the angle θ of the load bearing surfaces 76 of the second pair of lobes 72 with respect to the normal 78 to the load axis 66.

It is presently preferred that the angles σ, θ be equal in magnitude and be between about 30 and about 40 degrees. In a presently preferred embodiment, angles σ and θ are each about 30 degrees.

The double-acting joint 60 also includes a boss 80 configured at the end of the segment (or segments) to which the retaining member 68 is to be secured. Like the retaining member 68, the boss 80 is preferably symmetrical about the load axis 66. The boss 80 includes a proximate neck portion 82 and a distal body portion 84, with the neck portion 82 of the boss 80 having a width greater than the width of the body portion 84. The body portion 84 of the boss is configured with a first pair 86 and a second pair 88 of outwardly projecting lips each having a load bearing surface. Thus, each of the first pair of lips has a load bearing surface 90 and each of the second pair of lips 88 has a load bearing surface 92.

When assembled, the load bearing surfaces 90 of the first pair of lips 86 are in engagement with the respective load bearing surfaces 74 of the first pair of lobes 70 of the retaining member and the load bearing surfaces 92 of the second pair of lips 88 are in engagement with the respective load bearing surfaces 76 of the second pair of lobes 72 of the retaining member 68. The first pair of Lobes 70 of the retaining member 68 are positioned at a distal end of the segment to which they are attached (inner web segment 64 in the embodiment of FIG. 4) and are configured to mate with the boss 80 at the neck portion 82 of the boss.

Hence, the retaining member 68 includes two arms 96, 98 which extend about the body portion 84 of the boss 80 and terminate at the neck portion 82 of the boss 80. The arms 96, 98 of the retaining member are preferably configured to be symmetrical to each other about the load axis 66 and are positioned in the joint to be substantially contiguous to the entire exterior contour of the boss 80.

Precise clearances between the boss 80 and the retaining member 68 will be dictated by assembly parameters, including the length of the segments to be assembled. It has been found that a clearance of about 0.015, inches will permit assembly of segments up to about eight feet long. One of skill in the art of extrusion design and assembly will readily determine the appropriate tolerances for a given joint design.

As a load is applied to the segments 62, 66 placing the joint 60 in tension, the forces will act upon load bearing surfaces 76 and 92 in a direction normal to the surfaces, thereby tending to force lobes 72 to spread outwardly. Simultaneously, however, the forces acting upon load bearing surfaces 74 and 90 tend to force the first pair of lobes 70 in the opposite direction, thereby assisting in counteracting the spreading force being applied on lobes 72. Thus, it is presently preferred that the load bearing surfaces 74 of the first pair of lobes 70 extend inwardly towards the segment in which they are configured, thereby providing a load bearing surface which counteracts the load being applied at the load bearing surface 76 of the second pair of lobes 72.

By utilizing the double-acting joint configuration of the present invention, as illustrated in FIG. 4, it is estimated that an approximate 30 percent savings in material in the joint may be achieved when compared with a "single-acting" joint, such as that illustrated in FIGS. 1 through 3.

The double-acting joint 80 of this embodiment may be successfully utilized to connect together three segments, such as two outer wall segments and an inner web segment. For such an application, the boss 80 comprises two symmetrically shaped tabs 100 positioned in contiguous engagement—one tab configured at the end of the one of the outer wall segments 62 and the other tab configured at the end of the other outer wall segment. The tabs 100 each have a straight, back portion 102 which is in contiguous engagement with the corresponding back portion of the adjacent tab.

The contiguous tabs 100 form an exposed seam 104 along the exterior of the outer wall segments 62. A sealing weld 106, such as that formed by an electron beam welder, is preferably utilized for attaching the contiguous tabs 100 at the exposed seam 104.

As illustrated in FIG. 5, the double-acting joint 60 may be utilized in the assembly of extruded pressure vessels having a variety of cross-sectional configurations. Thus, as with the joint 20 illustrated in FIGS. 1 through 3, the double-acting joint 60 may also be utilized to connect any type of structural segment together. Of course, if the joint 60 is utilized to connect two interior segments together, as illustrated at 108, rather than the three segments illustrated in FIG. 4, no sealing weld is necessary.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A joint in a body portion of a multi-cell pressure vessel, the body portion having a substantially uniform cross section and comprising a plurality of arcuate outer wall segments connected with at least one internal web segment, the joint attaching adjacent ends of two of the arcuate outer wall segments and an end of the internal web segment, the joint having a cross section comprising:

tabs respectively configured at the adjacent ends of the arcuate outer wall segments, the tabs of the adjacent ends configured for contiguous engagement to form a boss having a proximate neck portion and a distal body portion, the neck portion of the boss having a width smaller than the width of the body portion of the boss; and a retaining member configured at the end of the internal web segment, the retaining member configured to capture the boss formed at the adjacent ends of the two arcuate outer wall segments.

2. A joint in a body portion of a multi-cell pressure vessel as defined in claim 1, wherein the contiguous tabs are symmetrical to each other.

3. A joint in a body portion of a multi-cell pressure vessel as defined in claim 1, wherein the boss has a perimeter which is configured in a curvilinear shape.

4. A joint in a body portion of a multi-cell pressure vessel as defined in claim 1, wherein the adjacent tabs form an exposed seam and further comprising a sealing weld attaching the adjacent tabs at the exposed seam.

5. A joint in a body portion of a multi-cell pressure vessel as defined in claim 1, wherein the arcuate outer wall segments and the internal web segment are formed by extrusion.

6. A joint in a body portion of a multi-cell pressure vessel as defined in claim 1, wherein the retaining member includes a pair of lobes which are symmetrical to each other and which extend about the body portion of the boss and terminate at the neck portion of the boss.

7. A joint in a body portion of a multi-cell pressure vessel as defined in claim 6, wherein the pair of lobes of the retaining member are substantially contiguous to the entire exterior contour of the boss.

8. A joint in a body portion of a multi-cell pressure vessel, the body portion having a substantially uniform cross section and comprising a plurality of arcuate outer wall segments connected with at least one internal web segment, the joint attaching adjacent ends of two of the arcuate outer wall segments and an end of the internal web segment, the outer wall segments and the internal web segment formed by extrusion, the joint having a cross section comprising:

tabs respectively configured at the adjacent ends of the arcuate outer wall segments, the tabs of the adjacent ends being symmetrical to each other, forming an exposed seam, and being configured for contiguous engagement to form a boss having a proximate neck portion and a distal body portion, the neck portion of the boss having a width smaller than the width of the body portion of the boss, the boss having a perimeter which is configured in a curvilinear shape;

a retaining member configured at the end of the internal web segment, the retaining member configured to capture the boss formed at the adjacent ends of the two arcuate outer wall segments; and a sealing weld attaching the adjacent tabs at the exposed seam.

9. A joint in a body portion of a multi-cell pressure vessel as defined in claim 8, wherein the adjacent tabs have respective straight, back portions in contiguous engagement with each other.

10. A joint in a body portion of a multi-cell pressure vessel as defined in claim 8, wherein the arcuate outer wall segments and internal web segment are formed of extruded aluminum.

11. A joint in a body portion of a multi-cell pressure vessel as defined in claim 8, wherein the retaining member includes a pair of lobes which are symmetrical to each other and which extend about the body portion of the boss and terminate at the neck portion of the boss.

12. A joint in a body portion of a multi-cell pressure vessel as defined in claim 11, wherein the pair of lobes of the retaining member are substantially contiguous to the entire exterior contour of the boss.

13. A joint in a body portion of a multi-cell pressure vessel, the body portion having a substantially uniform cross section and comprising first and second segments connected to each other, the joint being constructed and arranged for bearing a tensile load applied to the segments along a load axis and the joint having a cross section comprising:

a retaining member configured at an end of the first segment, the retaining member having a first and a second pair of inwardly projecting lobes each having a load bearing surface positioned at an angle with respect to the normal to the load axis, the angle of the load bearing surfaces of the first pair of lobes with respect to the normal to the load axis being opposite to the angle of the load bearing surfaces of the second pair of lobes with respect to the normal of the load axis; and a boss configured at an end of the second segment, the boss having a proximate neck portion and a distal body portion, the neck portion of the boss having a width smaller than the width of the body portion of the boss, the body portion having a first and a second pair of outwardly projecting lips each having a load bearing surface, the retaining member configured to capture the boss thereby placing the load bearing surfaces of the first pair of lips in engagement with the respective load bearing surfaces of the first pair of lobes of the retaining member and placing the load bearing surfaces of the second pair of lips in engagement with the respective load bearing surfaces of the second pair of lobes of the retaining member.

14. A joint as defined in claim 13, wherein the retaining member and the boss are substantially symmetrical about the load axis.

15. A joint as defined in claim 13, wherein the angle of the load bearing surfaces of the first pair of lobes with respect to the normal to the load axis is equal and opposite to the angle of the load bearing surfaces of the second pair of lobes with respect to the normal to the load axis.

16. A joint as defined in claim 15, wherein the angle of the load bearing surfaces with respect to the normal to the load axis is from about 30 to about 45 degrees.

17. A joint as defined in claim 16, wherein the angle of the load bearing surfaces with respect to the normal to the load axis is about 30 degrees.

18. A joint as defined in claim 15, wherein the first pair of lobes of the retaining member are positioned at a distal end of the first segment and are configured to mate with the boss at the neck of the boss, and wherein the load bearing surfaces of the first pair of lobes extend towards the first segment.

19. A joint as defined in claim 13, wherein the boss comprises two tabs in contiguous engagement, one tab configured at the end of the second segment and the other tab configured at an end of a third segment, thereby providing a joint which connects three segments.

20. A joint as defined in claim 19, wherein the contiguous tabs have respective straight, back portions in contiguous engagement with each other.

21. A joint as defined in claim 19, wherein the contiguous tabs are symmetrically shaped.

22. A joint as defined in claim 19, wherein the contiguous tabs form an exposed seam and further comprising a sealing weld attaching the contiguous tabs at the exposed seam.

23. A joint as defined in claim 13, wherein the boss has a perimeter which is configured in a curvilinear shape.

24. A joint as defined in claim 13, wherein the segments are formed by extrusion.

25. A joint as defined in claim 24, wherein the segments are formed of extruded aluminum.

26. A joint as defined in claim 13, wherein the retaining member has two arms which extend about the body portion of the boss and terminate at the neck portion of the boss.

27. A joint as defined in claim 26, wherein the two arms of the retaining member are symmetrical to each other.

28. A joint as defined in claim 26, wherein the two arms of the retaining member are substantially contiguous to the entire exterior contour of the boss.

29. A joint in a body portion of a multi-cell pressure vessel, the body portion having a substantially uniform cross section and comprising a plurality of arcuate outer wall segments connected with at least one internal web segment, the joint attaching adjacent ends of two of the arcuate outer wall segments and an end of the internal web segment, the joint being constructed and arranged for bearing a tensile load applied to the segments along a load axis and the joint having a cross section comprising:

tabs respectively configured at the adjacent ends of the arcuate outer wall segments, the tabs of the adjacent ends configured for contiguous engagement to form a boss having a proximate neck portion and a distal body portion, the neck portion of the boss having a width smaller than the width of the body portion of the boss, the body portion having a first and a second pair of outwardly projecting lips each having a load bearing surface, a retaining member configured at the end of the internal web segment, the retaining member having a first and a second pair of inwardly projecting lobes each having a load bearing surface positioned at an angle with respect to the normal to the load axis, the angle of the load bearing surfaces of the first pair of lobes with respect to the normal to the load axis being opposite to the angle of the load bearing surfaces of the second pair of lobes with respect to the normal of the load axis, wherein the retaining member is configured to capture the boss formed at the adjacent ends of the two arcuate outer wall segments, thereby placing the load bearing surfaces of the first pair of lips in engagement with the respective load bearing surfaces of the first pair of lobes of the retaining member and placing the load bearing surfaces of the second pair of lips in engagement with the respective load bearing surfaces of the second pair of lobes of the retaining member.

* * * * *